United States Patent [19]
Lee et al.

[11] Patent Number: 6,120,014
[45] Date of Patent: Sep. 19, 2000

[54] TWIST-CORRECTING DEVICE FOR WIRE ROPE ISOLATOR

[75] Inventors: Seung Kwon Lee, Daejon; Dae Young Park, Sungnam, both of Rep. of Korea

[73] Assignee: Agency for Defense Development, Daejon, Rep. of Korea

[21] Appl. No.: 09/129,526

[22] Filed: Aug. 5, 1998

[30] Foreign Application Priority Data

Nov. 15, 1997 [KR] Rep. of Korea ................. 97-32347

[51] Int. Cl.[7] ........................................ F16F 1/06
[52] U.S. Cl. ..................... 267/169; 267/136; 267/291
[58] Field of Search ............................ 267/136, 147, 267/148, 149, 166, 166.1, 167, 169, 170, 174, 177, 178, 179, 180, 182, 250, 286, 287, 288, 291; 248/149, 526, 570, 628, 638, 611, 562, 630, 603, 226.11, 154, 903; 188/378; 24/455, 486, 522–525

[56] References Cited

U.S. PATENT DOCUMENTS

| | | | |
|---|---|---|---|
| 1,080,013 | 12/1913 | Landin | 24/525 |
| 2,818,095 | 12/1957 | Stahl et al. | 24/525 |
| 5,369,850 | 12/1994 | Noble | 24/525 |
| 5,549,285 | 8/1996 | Collins | 267/136 |
| 5,609,328 | 3/1997 | Loziuk et al. | 267/136 |
| 5,791,636 | 8/1998 | Loziuk | 267/136 |

*Primary Examiner*—Robert J. Oberleitner
*Assistant Examiner*—Robert A. Siconolfi
*Attorney, Agent, or Firm*—Scully, Scott, Murphy & Presser

[57] ABSTRACT

A twist-correcting device for a wire rope isolator, the retaining bars of which may become twisted in the process of installing the conventional wire rope isolator between a platform and an apparatus, which makes it difficult to assemble the wire rope isolator and prevents the isolator from performing fully. The twist-correcting device includes a pair of clamps for correcting the twisting of the retaining bars of the isolator by holding the retaining bars closely parallel to each other at both end portions of the wire rope isolator. The twist-correcting device is capable of simplifying the installation of a wire rope isolator between a platform and an apparatus and enabling the wire rope isolator to perform at its best.

5 Claims, 4 Drawing Sheets

TWIST-CORRECTING DEVICE FOR WIRE ROPE ISOLATOR

BACKGROUND OF THE INVENTION

1. Field of the Invention

The present invention relates to a twist-correcting clamp device for wire rope isolator capable of simplifying the installation of an apparatus on a platform using such a wire rope isolator by correcting for twisting of retaining bars of the wire rope isolator.

2. Background of the Invention

A wire rope isolator is generally installed between a platform and an apparatus for minimizing vibration and impact generated when the apparatus is installed on the platform.

Especially, in installing a weighty object, it is much effective to use a wire rope isolator.

The conventional wire rope isolator includes a buffer formed by a wire rope usually in a coil shape and a pair of retaining bars respectively connected to the upper and lower portions of the buffer.

The methods for installing the wire rope isolator between a platform and an apparatus include; fixing the isolator onto the platform and installing the apparatus, or fixing the isolator to the apparatus and installing the apparatus onto the platform, and the like. In any case of the cases described above, when one of the retaining bars of the wire rope isolator is fixed to the platform or the apparatus, the other retaining bar may become twisted due to the deforming of the generally coil-shaped wire rope buffer therebetween.

In case the wire rope isolator is twisted, it is difficult to mount an unfixed retaining bar and an apparatus onto a platform. Accordingly, in case a twisted wire rope isolator is installed between a platform and an apparatus, the isolator cannot perform fully as well as there are a great deal of difficulties in installing a wire rope isolator between a platform and an apparatus.

SUMMARY OF THE INVENTION

The primary object of the present invention is to provide a twist-correcting device for a wire rope isolator capable of simplifying the installation of a wire rope isolator by correcting for twisting resulting from a wire rope in installing the wire rope isolator between a platform and an apparatus, thereby enabling the wire rope isolator to perform at its best.

In order to achieve the above-described object, in accordance with the present invention there is provided a twist-correcting device for a wire rope isolator formed by a buffer with a coil-shaped wire rope and retaining bars connected respectively to the upper and lower of the buffer which apparatus includes a pair of clamps correcting for twisting of the retaining bars by holding the pair of retaining bars closely to each other at both end portions of the wire rope isolator.

The pair of clamps described above include a pair of clamp supports provided at the front and rear, respectively, with retaining grooves being formed therein, to accommodate the end portions of the retaining bars being inserted and supported in the retaining grooves, respectively, and a clamping bolt for tightening the clamp supports closely to each other.

The retaining grooves in the clamp supports have an end wall for abutting closely against the end portions of the corresponding retaining bar, a shoulder for abutting closely against the top and bottom sides of both end portions of the retaining bars, respectively and a clamping side wall for abutting closely against the front and rear sides of both end portions of the retaining bars, respectively.

A through hole is formed through the center of the front clamp support, and a clamping bolt is passed thereinto and threaded into a threaded hole formed in the center of the rear clamp support.

A location determining pin is provided projecting from the rear side of the front clamp support and a location determining hole is formed in the front side of the rear clamp support, the location determining pin being insertable thereinto.

Elastic supports are inserted and installed between the front clamp support and the rear clamp support to elastically urge the front and rear clamp supports apart from each other. The elastic support is a compression type coil spring and a spring receiving bore is formed at the front of the location determining hole, the elastic support being receivable into the spring receiving bore.

The object and advantages of the present invention will become more readily apparent from the detailed description given hereinafter. However, it should be understood that the detailed description and specific example, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE INVENTION

With reference to the attached drawings, the twist-correcting device for wire rope isolator according to the present invention is described in detail in the following.

Figure 1A:
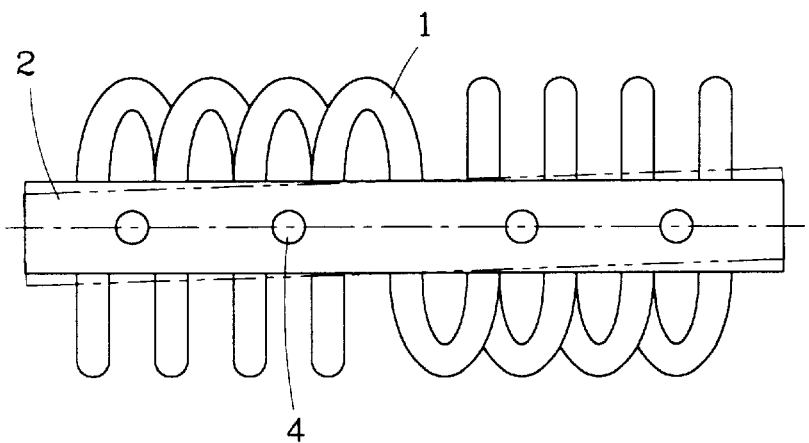
FIGS. 1a and 1b are a top plan view and an end side view respectively, illustrating relative twisting of the retaining bars of a conventional wire rope isolator.
Figure 1B:
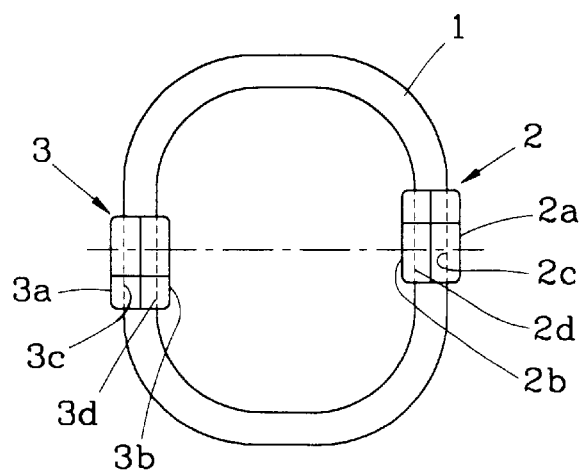

FIGS. 1a and 1b illustrate a wire rope isolator according to the conventional art. The wire rope isolator includes a buffer 1 formed of a wire rope usually in a coil shape and a pair of upper and lower retaining bars 2, 3 joined to the upper and lower portions of the buffer, respectively.

The buffer 1 and the upper and lower retaining bars 2, 3 are connected by composing each of the upper and lower retaining bars 2, 3 of two bar supports (2a, 2b)(3a, 3b), respectively, forming several insertion grooves (2c, 2d) (3c, 3d) in the inner portions of the bar supports (2a, 2b) (3a, 3b), the wire rope composing the buffer 1 being inserted thereinto by inserting the upper and lower portions of the coil turns of the buffer 1 into the insertion grooves (2c, 2d) (3c, 3d), and finally, fastening the bar supports (2a, 2b) (3a, 3b) together with fixing screws 4, bolts and nuts, or the like.

As shown in FIG. 1a and 1b, in case the upper and lower retaining bars of the wire rope isolator are installed between a platform and an apparatus, the upper and lower retaining bars 2, 3 may not be paralleled with each other. The full lines marked in FIG. 1a illustrate the normal state of the retaining bars 2, while the dotted lines illustrate the twisted retaining bars 2.

Figure 2:
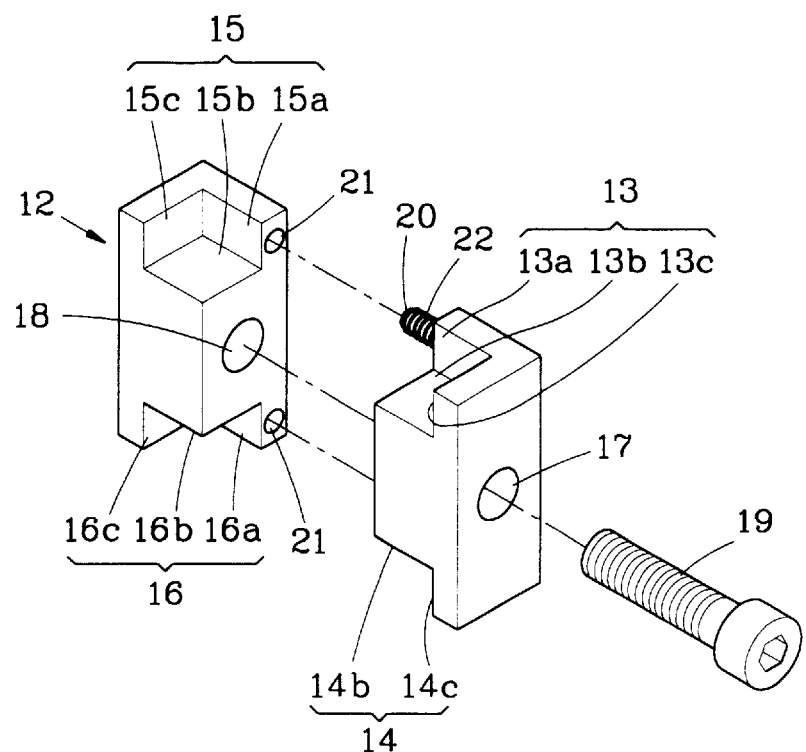
FIG. 2 is an exploded perspective view illustrating the twist-correcting device according to the present invention.
Figure 4A:
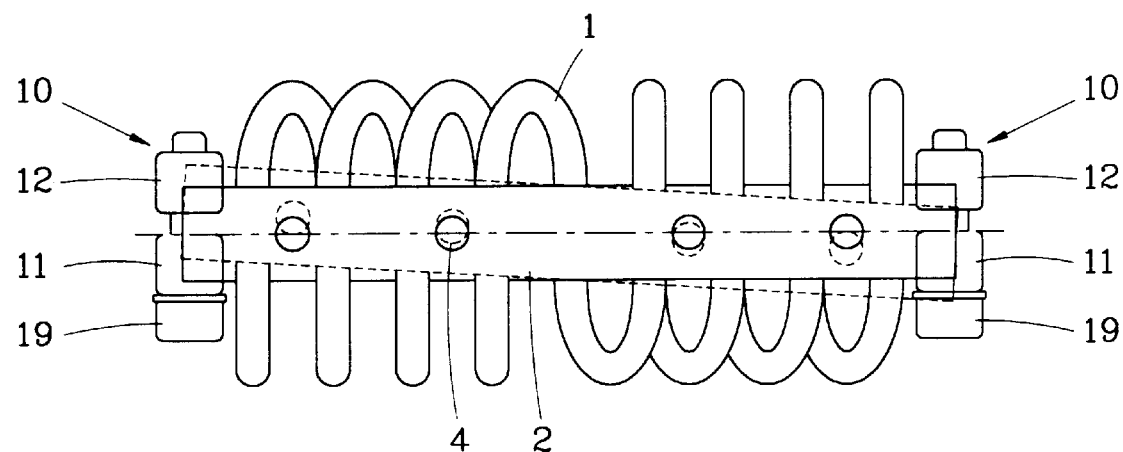
FIGS. 4a and 4b are a plan view and an end side view respectively, illustrating the initial assembled state of the twist-correcting device on a wire rope isolator according to the present invention.
Figure 4B:
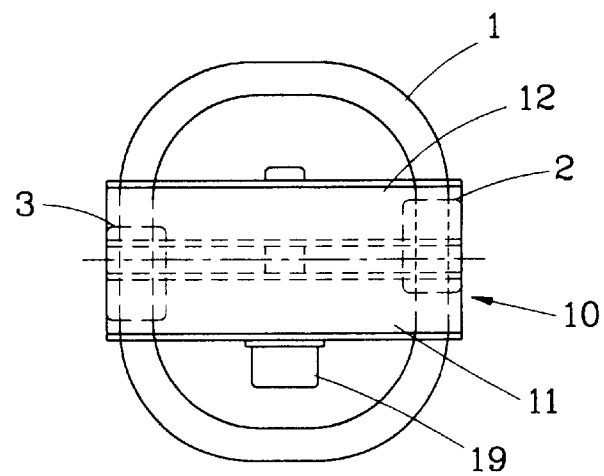

As illustrated in FIGS. 2, 4a and 4b, the twist-correcting device for a wire rope isolator is intended to be installed over both end portions of the wire rope isolator and includes a pair of clamps 10, 10 which are bilaterally symmetrical. FIG. 2 illustrates the clamp 10 positioned to be arranged on the right end of the isolator, however, as the clamp on the left is formed bilaterally symmetrically, the corresponding portions are marked with the identical numbers instead of illustrating the clamp arranged on the left end of the isolator.

The clamps 10, 10 each include a pair of clamp supports 11, 12 at the front and rear, respectively, with retaining grooves (13, 14) (15, 16) formed therein, for enabling the end portions of the upper and lower retaining bars to be inserted and supported in the retaining grooves and a clamping bolt 19 for tightening the clamp supports closely to each other.

The clamp supports 11, 12 are formed symmetrically to one another in order to face one another at the front and rear of the isolator.

The retaining grooves (13, 14) (15, 16) are formed to conform in size and shape with the end portions of the retaining bars (2) (3).

The front upper retaining groove 13 has an end wall 13a for abutting closely to the end portion of the upper retaining bar 2, a bottom shoulder 13b for abutting closely to the undersurface of the retaining bar 2 and a clamping side wall 13c for abutting closely to the front side of the retaining bar 2. The front lower retaining groove 14 has an end wall 14a for abutting closely to the end portion of the lower retaining bar 3, an upper shoulder for abutting closely to the upper portion of the lower retaining bar 3 and the clamping side wall 14c for abutting closely to the front portion of the lower retaining bar 3. The rear upper retaining groove 15 has an end wall 15a for abutting closely to the end portion of the upper retaining bar 2, a bottom shoulder 15b for abutting closely to the lower portion of the upper retaining bar 2 and a clamping side wall 15c for abutting closely to the rear portion of the retaining bar 2. The rear lower retaining groove 16 has an end wall 16a for abutting closely to the end portion of the lower retaining bar 3, an upper shoulder 16b for abutting closely to the lower retaining bar 3 and a clamping side wall 16c for abutting closely to the rear portion of the lower retaining bar 3.

Figure 3:
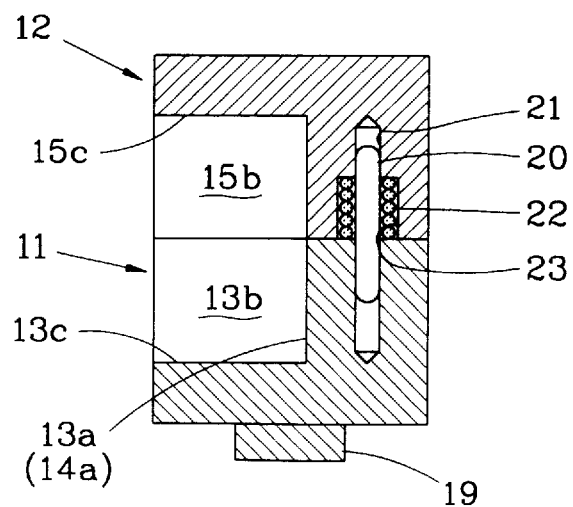
FIG. 3 is a cross-sectional view illustrating the assembled state of a clamp composing the twist-correcting device according to the present invention.

In FIG. 2, the inside surface of the end wall 14a if the lower retaining groove 14 in the front clamp support 11 is not visible and is not designated but it is designated parenthetically together with the end wall 13a in the cross-sectional view illustrated in FIG. 3.

A through hole 17 is formed through the center of the front clamp support 11, and a clamping bolt 19 is inserted therethrough, and a threaded hole 18 is formed through the center of the rear clamp support 12, the clamping bolt 19 being threaded thereinto after being passed through the through hole 17. A pair of location determining pins 20 (only the upper location determining pin is visible in FIG. 2) are installed projecting from the rear upper and lower portions of the front clamp support 11. In order to connect the front clamp support 11 to the rear clamp support 12, the location determining hole 21 is formed in the front portion of the clamp support 12, the location determining pin 20 being inserted thereinto.

In addition, the elastic support 22 is inserted over the pin 20 and installed between the front clamp support 11 and the rear clamp support 12 in order to elastically urge the clamp supports apart from each other.

As shown in FIG. 2, compression type coil springs are used as the elastic support 22 and are wound over the location determining pin 20.

A receiving bore 23 is formed in the front part of the location determining hole 20, the end portion of the elastic support 22 being insertable thereinto. The receiving bore 23 is sufficiently deep for receiving the compressed elastic support 22 completely in order that the front clamp 11 and the rear clamp 12 can adhere closely to each other when the front and rear clamps 11, 12 are tightened by the clamping bolt 19.

In order to install the twist-correcting device according to the present invention on a wire rope isolator, as shown in FIG. 2, in the condition that the front clamp support 11 and the rear clamp support 12 are separated from each other, the clamping bolt 19 should be inserted through the through hole 17 in the front clamp support 11 and then, threaded into the threaded hole 18 of the rear clamp support 12; however, the clamping bolt 19 should not be tightened completely and thus, is maintained a space between the front and rear clamp supports 11, 12.

At this time, as the clamp supports 11, 12 are urged apart from each other by the elastic support 22 inserted between them and therefore, the clamp supports 11, 12 are kept spaced apart and the end portions of both retaining bars 2, 3 can be easily inserted into the retaining grooves (13, 14) (15, 16) of the clamp supports 11, 12, respectively.

Under the above-described circumstances, the end portions of both the upper and lower retaining bars 2, 3 which are not parallel to each other are inserted into the retaining grooves (13, 14) (15, 16), respectively and thereby being provisionally assembled as illustrated in FIGS. 4a and 4b.

In the state of being provisionally assembled, the ends of the upper and lower retaining bars 2, 3 fit closely against the end walls 13a, 14a, 15a, 16a in the retaining grooves (13, 14) (15, 16), respectively, the lower sides of both end portions of the upper retaining bar 2 abut closely against the upper shoulders 13b, 15b, respectively, the upper sides of both end portions of the lower retaining bar 3 abut closely against the bottom shoulders 14b, 16b, respectively, and the front and rear sides of both end portions of the upper and lower retaining bars 2, 3 are kept facing to the clamping side walls 13c, 14c, 15c, 16c, respectively.

Figure 5A:
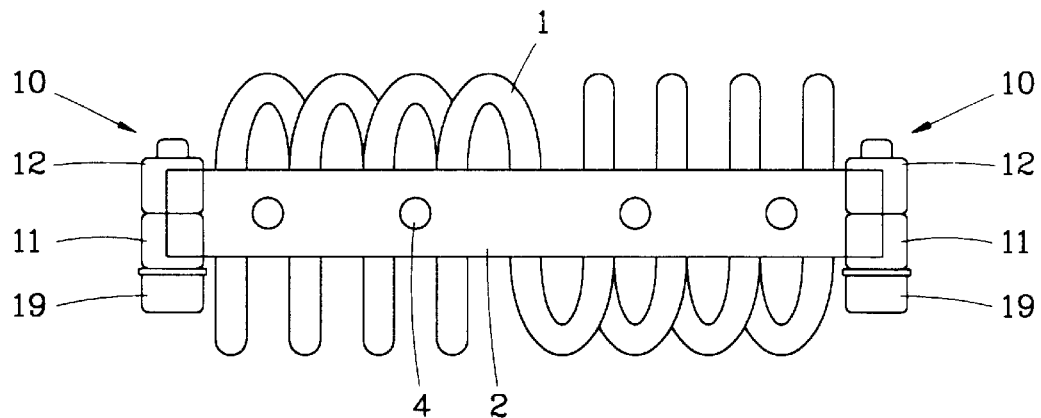
FIGS. 5a, 5b and 5c are a plan view, a side view and an end side view respectively, illustrating the state that twist of the wire rope isolator is corrected by the twist-correcting device according to the present invention.
Figure 5B:
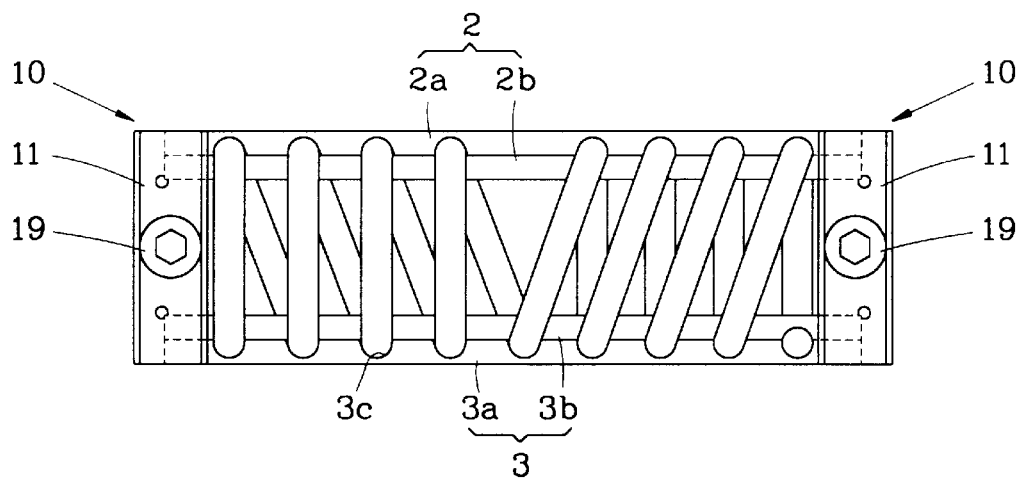
Figure 5C:
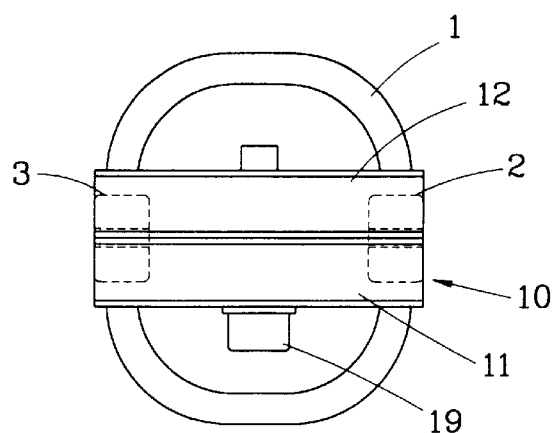

In this condition, as the clamping bolt 19 is tightened in the threaded hole 18, the front clamp support 11 and the rear clamp support 12 come closely to each other thereby. When the clamping bolt 19 is tightened completely, the upper and lower retaining bars 2, 3 become parallel with each other, as shown in FIGS. 5a, 5b and 5c.

That is, when the clamping bolt 19 of each of the devices is tightened in the state illustrated in FIG. 4a, in case of the right clamp 10, the clamping side wall 13c of the front upper retaining groove 13 in the front clamp support 11 pushes the front side of the right end portion of the upper retaining bar 2 to the back and thus, the rear side of the right end portion of the upper retaining bar 2 abuts closely against the clamping side wall 15c of the rear upper retaining groove 15 in the rear clamp support 12, and the clamping side 16c of the rear lower retaining groove 16 in the rear clamp support 12 pushes the rear side of the right end portion of the lower retaining bar 3 to the front and thus, the front side of the right end portion of the lower retaining bar 3 abuts closely against the clamping side wall 14c of the front lower retaining groove 14 in the front clamp support 11. In the case of the left clamp 10, the clamping side wall 15c of the rear upper retaining groove 15 in the rear clamp support 12 pushes the rear side of the left end portion of the upper retaining bar 2 to the front and thus, the front side of the left end portion of the upper retaining bar 2 abuts closely against the clamping side 13c of the upper retaining groove 13 of the front clamp support 11 and, the clamping side wall 14c of the front lower retaining groove 14 in the front clamp support 11 pushes the front side of the lower retaining bar 3 to the back and thus, the rear side of the lower retaining bar 3 abuts closely to the clamping side wall 16c of the lower retaining groove 16 in the rear clamp support 12. As shown in FIG. 4a, the upper retaining bar 2 displaces in a counterclockwise direction and the lower retaining bar 3 displaces in a counterclockwise direction thereby. Consequently, the upper and lower retaining bars 2, 3 are brought into a parallel state, as illustrated in FIGS. 5a, 5b and 5c.

At this time, the elastic support 22 is completely received inside the enlarged receiving bore 23 formed at the front of the location determining hole 21, and the front clamp support 11 and the rear clamp support 12 are capable of abutting completely against each other thereby.

As described above, the present invention makes it possible to correct for twisting of a wire rope isolator simply and easily. As a result, the present invention not only makes it easier to install a wire rope isolator between a platform and an apparatus but also enables a wire rope isolator to perform fully.

As the present invention may be embodied in several forms without departing from the spirit of essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within meets and bounds of the claims, or equivalences of such meets and bounds are therefore intended to embrace the appended claims.

What is claimed is:

1. A twist-correcting device for wire rope isolator having a buffer formed of a coil-shaped wire rope and a pair of retaining bars connected respectively to upper and lower portions of the buffer comprising:

a pair of clamps for correcting relative twisting of the retaining bars by aligning the retaining bars closely parallel to each other at both end portions of the wire rope isolator;

the pair of clamps further comprising front and rear clamp supports in which retaining grooves are formed in upper and lower portions of each of the clamps for receiving the end portions of the retaining bars therein;

a clamping bolt for tightening the front and rear clamp supports in close proximity to each other; and each retaining groove further comprising an end wall abutting closely against an end portion of the corresponding retaining bar, a shoulder for abutting closely to the end portions of the corresponding retaining bar and a clamping side wall for abutting closely to a side of the end portions of the corresponding retaining bar.

2. The twist-correcting device according to claim 1, wherein a through hole is formed in a center of the front clamp support, the clamping bolt being insertable the through hole, and a threaded hole is formed in a center of the rear clamp support, the clamping bolt being threadable into the threaded hole.

3. The twist-correcting device according to claim 1, wherein at least one location determining pin is provided projecting from a rear portion of the front clamp support and a location determining hole is formed in a front portion of the rear clamp support, the location determining pin being insertable thereinto.

4. The twist-correcting device according to claim 1, wherein an elastic support is inserted between the front clamp support and the rear clamp support, the elastic support elastically urging the front clamp support and the rear clamp support apart from each other.

5. The twist-correcting device according to claim 4 wherein the elastic support member is a compression type coil spring wound onto a location determining pin provided on the front clamp support, and a spring receiving bore is formed in a front part of a location determining hole formed in the rear clamp support, the elastic support member being insertable thereinto.

* * * * *